Jan. 17, 1928.

R. H. UHLEMANN 1,656,403

SPECTACLE MOUNTING

Filed March 28, 1927

INVENTOR:
RICHARD H. UHLEMANN,
by Robert Burns
ATTY.

Patented Jan. 17, 1928.

1,656,403

UNITED STATES PATENT OFFICE.

RICHARD H. UHLEMANN, OF CHICAGO, ILLINOIS.

SPECTACLE MOUNTING.

Application filed March 28, 1927. Serial No. 178,858.

This invention relates to that type of hinge connections for spectacle and like mountings in which the lens holding rings are of the split type and have independent screws for fastening the rings on the lenses and for pivotal attachment of the temple members, and has for its object:

To provide a structural formation and combination of parts whereby a strong and compact arrangement of parts is attained with the covering and concealment at front of the seams or joints of the parts, all as will hereinafter more fully appear.

In the accompanying drawing:

Fig. 1.

Figure 1:
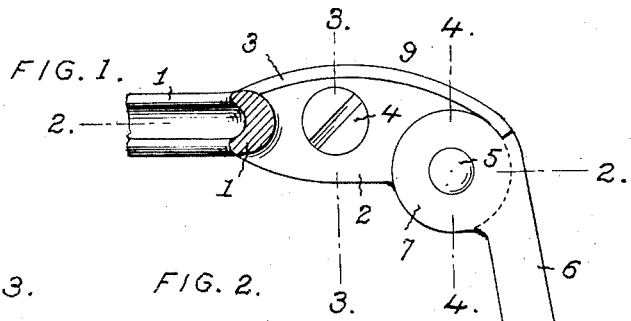
Fig. 1 is an enlarged top view, partly in section of portions of a split frame ring and temple at their point of joindure, and illustrating the arrangement of parts in the present invention.
Figure 3:
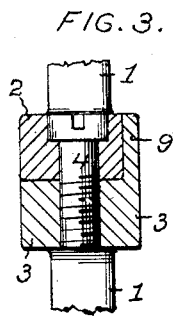
Figure 4:
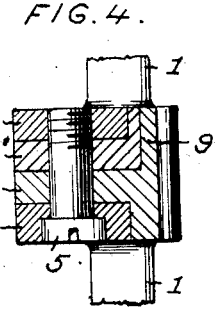

Figs. 3 and 4 are enlarged detail transverse sections on lines 3—3, and 4—4, respectively.

Figure 5:
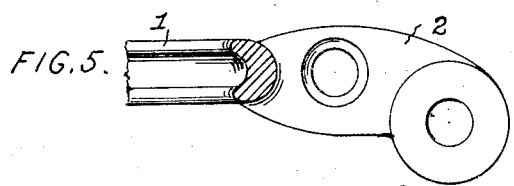

Fig. 5, is an enlarged top view of the upper ear of the split ring of a frame.

Figure 6:
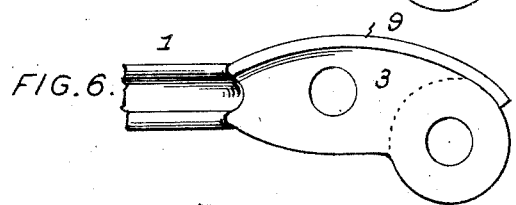

Fig. 6, is a similar view of the lower ear of the same.

Figure 7:
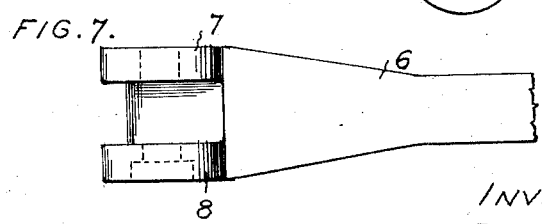

Fig. 7, is an enlarged detail elevation of the inner side of the knuckle portion of the temple.

Like reference numerals indicate like parts in the several views.

The present invention is shown in the drawing, applied to the outer portion of the split lens holding ring of a spectacle mounting, with such ring portion provided with the usual and approximately counterpart upper and lower lateral and rearwardly curved ears 2 and 3, with the connecting screw 4, by which the same are drawn together to effect a contraction of the split ring 1 and proper holding engagement with a lens, arranged separate from and in adjacent relation to the pintle or screw 5 by which pivotal connection is made between said ears and the temple member 6 of the spectacle mounting. In connection with the above described construction, the preferred form of the present invention comprises and involves a detail formation of the above mentioned parts as follows.

Figure 2:
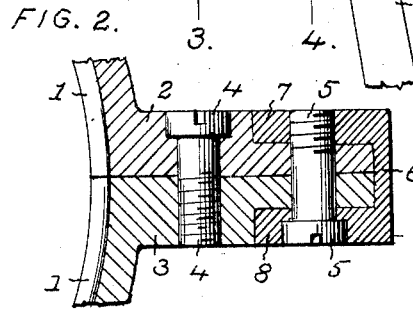
Fig. 2 is an enlarged detail longitudinal section on line 2—2.

The portions of the ears 1 and 2, adjacent to the connection to the split ring member 1 are of a rectangular form in cross-section, with the connecting screw 4 passing loosely through the upper ear 2, with its head seated in a counter-sink in said ear, and with its screw threaded end screwing into a complementary bore in the lower ear 3, as shown in Fig. 2.

The remote or outer portions of the ears 2 and 3 are of a rounded shape, provided with aligned central orifices for the reception of the pivot screw 5 of the temple member 6 aforesaid, and concentric with said orifices, the upper part of the upper ear 2 is formed with a receiving offset or recess for the upper pivot knuckle 7 of the temple 6, while the under part of the lower ear 3 is formed with a similar receiving offset or recess for the lower pivot knuckle 8 of the temple 6. In the preferred construction shown each offset or recess just described is of a depth equal to one-half the height of an ear 2 and 3, in which the particular offset or recess is formed.

In order to fit and have proper operative connection with the ring ears 2 and 3 above described, the temple member 6 is formed with centrally orificed upper and lower knuckles 7 and 8 of a circular form as shown, with said knuckles arranged in separated relation corresponding with the distance between the heretofore described receiving offsets or recesses in the ears 2 and 3, so as to fit snugly and turn in said recesses. With such construction the pivot screw 5 passes loosely through the lower knuckle 8, with its head seated in a counter-sink in said knuckle, thence in a like loose manner through the orifices in the ears 2 and 3, with the upper screw threaded end of the screw 5 screwing into a complementary orifice or bore in the upper knuckle 8 of the temple 6.

A material feature of the present improvements consists in forming the upper ear 2 aforesaid of a less width from front to rear, than the companion lower ear 3, and providing said lower ear 3 with an upstanding flange 9 the extent of the forward face and of a height equal to the height of the upper ear 2. This construction provides a receiving cavity for said upper ear to conceal from view the horizontal seam or joint between said upper and lower ears. Such construction imparts rigidity to the connections between the ears as well as to the connection of the temple, and thus admits of a compact formation of the present parts.

Having thus fully described my invention, what I claim and desire to secure by Letters Patent, is:—

1. In a spectacle mounting, the combination of a split lens holding ring having lateral ears at its point of split, a connecting screw passing through said ears adjacent to the point of attachment of the same to the split ring, the outer portions of said ears having centrally orificed recesses of a circular form, a temple member having pivot knuckles fitting said recesses, and an individual screw connecting the temple member and lateral ears together, one of said ears having a flange at its front side extending the transverse length of the same and of a height equal to the height of the other ear, with such other ear of a reduced width to fit the recess formed by said flange.

2. In a spectacle mounting the combination of a split lens holding ring having lateral ears at its point of split, a connecting screw passing through said ears adjacent to the point of attachment of the same to the split ring, the outer portions of said ears having centrally orificed recesses of a circular form in the outer portion of the upper face of the upper ear, and in the outer portion of the under face of the lower ear, a temple member having pivot knuckles fitting said recesses, and an individual screw connecting the temple member and lateral ears together, one of said ears having a flange at its front side extending the transverse length of the same and of a height equal to the height of the other ear, with said other ear of a reduced width to fit the recess formed by said flange.

Signed at Chicago, Illinois, this 22nd day of March, 1927.

RICHARD H. UHLEMANN.